(12) United States Patent
Tatami et al.

(10) Patent No.: US 9,879,168 B2
(45) Date of Patent: Jan. 30, 2018

(54) METHOD FOR PRODUCING HEXAGONAL BORON NITRIDE, AND HEAT DISSIPATION SHEET

(71) Applicants: Denka Company Limited, Chuo-ku, Tokyo (JP); National University Corporation Yokohama National University, Yokohama-shi, Kanagawa (JP)

(72) Inventors: Junichi Tatami, Yokohama (JP); Midori Sotokawa, Yokohama (JP); Koki Ikarashi, Omuta (JP); Hideki Hirotsuru, Omuta (JP)

(73) Assignee: Denka Company Limited, Tokyo (JP)

( * ) Notice: Subject to any disclaimer, the term of this patent is extended or adjusted under 35 U.S.C. 154(b) by 0 days.

(21) Appl. No.: 15/110,030

(22) PCT Filed: Jan. 8, 2015

(86) PCT No.: PCT/JP2015/050367
§ 371 (c)(1),
(2) Date: Jul. 6, 2016

(87) PCT Pub. No.: WO2015/105145
PCT Pub. Date: Jul. 16, 2015

(65) Prior Publication Data
US 2016/0333246 A1  Nov. 17, 2016

(30) Foreign Application Priority Data
Jan. 8, 2014 (JP) .................................. 2014-001897

(51) Int. Cl.
*C01B 21/064* (2006.01)
*C09K 5/14* (2006.01)
(Continued)

(52) U.S. Cl.
CPC .............. *C09K 5/14* (2013.01); *C01B 21/064* (2013.01); *C01B 21/0646* (2013.01);
(Continued)

(58) Field of Classification Search
CPC ..... C01B 21/064; C01B 21/0648; C08K 3/38; C08K 203/385; C08K 2201/001
See application file for complete search history.

(56) References Cited

U.S. PATENT DOCUMENTS 5,908,795 A * 6/1999 Nishio .................. C01B 21/064
501/100
6,319,602 B1 * 11/2001 Fauzi ..................... B82Y 30/00
423/290
(Continued)

FOREIGN PATENT DOCUMENTS

CN  101318636 A  12/2008
JP  5-808 A  1/1993
(Continued)

OTHER PUBLICATIONS

Machine translation of Nishio (JP08012440A), pulication date 1996.*
(Continued)

*Primary Examiner* — Jun Li
(74) *Attorney, Agent, or Firm* — Leydig, Voit & Mayer, Ltd.

(57) ABSTRACT

There is provided a method for producing hexagonal boron nitride, including a heating step of heating a mixture containing boron carbide and an alkaline earth metal compound under an ammonia atmosphere at 1300-1500° C. to obtain a product containing hexagonal boron nitride, wherein a molar ratio of the boron carbide to the alkaline earth metal compound in the mixture is 0.5-2.0.

5 Claims, 1 Drawing Sheet

(51) Int. Cl.
C09D 5/32 (2006.01)
C08K 3/38 (2006.01)
C09D 1/00 (2006.01)
C09D 183/04 (2006.01)

(52) U.S. Cl.
CPC ............ *C01B 21/0648* (2013.01); *C08K 3/38* (2013.01); *C09D 1/00* (2013.01); *C09D 5/32* (2013.01); *C09D 183/04* (2013.01); *C01P 2002/70* (2013.01); *C01P 2004/61* (2013.01); *C01P 2006/32* (2013.01); *C08K 2003/385* (2013.01); *C08K 2201/001* (2013.01)

(56) References Cited

U.S. PATENT DOCUMENTS

| | | | | |
|---|---|---|---|---|
| 6,645,612 B2* | 11/2003 | Pujari | ................... | C01B 21/064 257/717 |
| 7,815,733 B2* | 10/2010 | Iwai | ................... | C30B 9/00 117/11 |
| 2012/0196128 A1* | 8/2012 | Gohara | ................. | C01B 21/064 428/402 |

FOREIGN PATENT DOCUMENTS

| | | |
|---|---|---|
| JP | 7-41311 A | 2/1995 |
| JP | 8-12440 A | 1/1996 |
| JP | 11-29307 A | 2/1999 |
| JP | 2007-308360 A | 11/2007 |
| JP | 2010-37123 A | 2/2010 |

OTHER PUBLICATIONS

Machine translation of Matsumoto (JP2010037123), publication date Feb. 8, 2010.*

International Bureau of WIPO, International Preliminary Report on Patentability in International Patent Application No. PCT/JP2015/050367, dated Jul. 21, 2016, 8 pp.

* cited by examiner

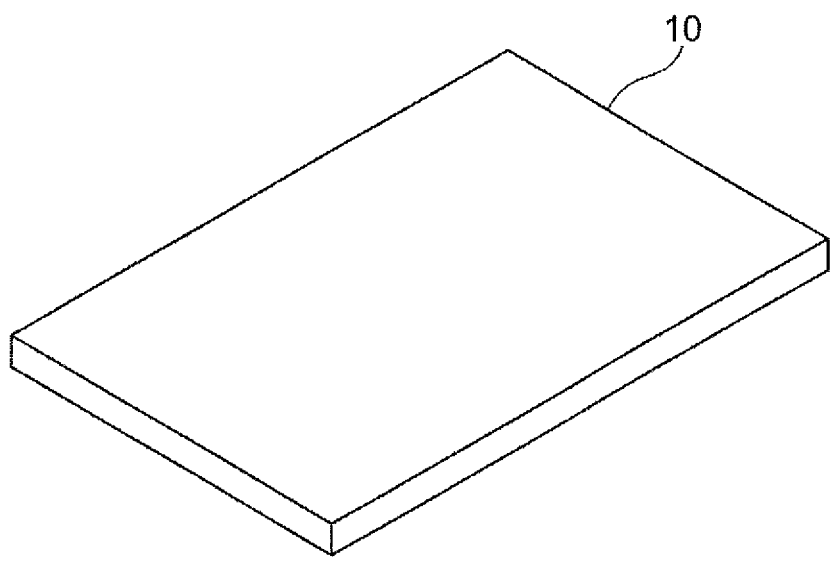

METHOD FOR PRODUCING HEXAGONAL BORON NITRIDE, AND HEAT DISSIPATION SHEET

CROSS-REFERENCE TO RELATED APPLICATONS

This patent application is the U.S. national phase of International Application No. PCT/JP2015/050367, filed on Jan. 8, 2015, which claims the benefit of Japanese Patent Application No. 2014-001897, filed Jan. 8, 2014, the disclosures of which are incorporated herein by reference in their entireties for all purposes.

TECHNICAL FIELD

This disclosure relates to methods for producing hexagonal boron nitride, and heat dissipation sheets containing hexagonal boron nitride obtained by the production methods.

BACKGROUND ART

Hexagonal boron nitride has a layered structure similar to graphite. Hexagonal boron nitride is excellent in such properties as thermal conductance, insulation property, chemical stability, solid lubricity, and thermal shock resistance, and therefore is applied in solid lubricants, release agents, fillers for resins and rubbers, heat-resistant sintered bodies, insulating sintered bodies and the like, utilizing these properties.

As methods for producing hexagonal boron nitride, various methods are known (see for example, Patent Literature 1 and 2). Specific examples thereof are as follows:

(1) a method of making a compound containing boron and oxygen such as boric acid, boron oxide, or borax supported on a filler such as calcium phosphate, and then firing the resultant under an ammonia atmosphere;

(2) a method of firing a mixture of the above boron compound with a compound containing nitrogen such as dicyandiamide, melamine, or urea;

(3) a method of firing a mixture of the above boron compound with a reducing material such as carbon under a nitrogen gas atmosphere;

(4) a method of firing a mixture of boron carbide and a powder of at least one of boric anhydride and a compound, which produces boric anhydride by heating, under a non-oxidizing atmosphere containing nitrogen such as nitrogen or ammonia (see Patent Literature 1);

(5) a method of mixing diboron trioxide and/or its precursor into a product obtained after firing boron carbide under a nitrogen atmosphere, and firing the resultant to remove side-product carbon (see Patent Literature 2).

CITATION LIST

Patent Literature

Patent Literature 1: Japanese Unexamined Patent Publication Application No. H5-000808
Patent Literature 2: Japanese Unexamined Patent Publication Application No. 2007-308360

SUMMARY OF INVENTION

Technical Problem

In the method of (1), however, the compound containing boron and oxygen melts during firing, and therefore the contact area between the compound and the ammonia atmosphere is not large. In the method of (2), the nitrogen-containing compound easily vaporizes or decomposes during firing, and thus it is hard to increase the production rate for boron nitride. In the method of (3), the reducing material which is hardly removed by convenient workup such as acid wash is apt to remain as impurities.

In the method of (4), the melting point of boric anhydride is as low as 480° C., and it gradually volatilizes at elevated temperatures, thereby producing a change in the mixing ratio with boron carbide to cause composition deviation. Thus, there is a problem that boron carbide is apt to remain as impurities. In the method of (5), 2-stage high-temperature heat treatment is needed at 1800-2200° C. for nitriding boron carbide and at 1500-2200° C. for removing side-product carbon being impurities. Thus, there is a problem that the cost of the prepared hexagonal boron nitride is higher.

The present invention was made in order to solve the problems of conventional methods for producing hexagonal boron nitride, and in one aspect, aims at providing a method for efficiently producing hexagonal boron nitride with high crystallinity. In another aspect, the present invention also aims at providing a heat dissipation sheet having both high insulation property and high thermal conductance.

Solution to Problem

In one aspect, the present invention provides a method for producing hexagonal boron nitride, comprising a heating step of heating a mixture containing boron carbide and an alkaline earth metal compound under an ammonia atmosphere at 1300-1500° C. to obtain a product containing hexagonal boron nitride, wherein a molar ratio of the boron carbide to the alkaline earth metal compound in the mixture is 0.5-2.0.

The above production method has a heating step of heating a mixture containing boron carbide and an alkaline earth metal compound at a predetermined molar ratio under an ammonia atmosphere at a lower temperature than conventional to obtain a product containing hexagonal boron nitride. In such a heating step, boron carbide and the alkaline earth metal compound, which are used as raw materials, can be fully reacted. For this reason, the amount of the raw materials remained and the amount of side-product produced can be reduced enough to efficiently produce hexagonal boron nitride. The hexagonal boron nitride obtained after the above heating step has high crystallinity.

The alkaline earth metal compound may contain at least one selected from the group consisting of calcium carbonate, strontium carbonate, and barium carbonate. The above production method may comprise a purification step of removing a solution containing a different compound from hexagonal boron nitride from a suspension obtained by mixing the product and a washing liquid containing an acid to obtain a solid product containing hexagonal boron nitride. The mean particle size of the hexagonal boron nitride may be 0.1-300 μm, and the graphitization index (GI) may be 6 or less.

In one aspect, the present invention provides a heat dissipation sheet comprising the hexagonal boron nitride obtained by the above-mentioned production method and at least one of a resin and a rubber. Such a heat dissipation sheet comprises the hexagonal boron nitride with high crystallinity obtained by the above-mentioned production method, and therefore has both high insulation property and high thermal conductance.

Advantageous Effects of Invention

In one aspect, the present invention can provide a method for efficiently producing hexagonal boron nitride with high crystallinity. In another aspect, the present invention can also provide a heat dissipation sheet having both high insulation property and high thermal conductance.

BRIEF DESCRIPTION OF DRAWINGS

FIG. 1 is a perspective view illustrating one embodiment of a heat dissipation sheet of the present invention.

DESCRIPTION OF EMBODIMENTS

One embodiment of the present invention will now be described in detail below. Note that the embodiment below is an example for describing the present invention and is not intended to limit the present invention to the contents below. The production method in this embodiment can provide efficiently hexagonal boron nitride of high crystallinity (highly crystalline), which could not be achieved by the conventional art, by heating a mixture of boron carbide and an alkaline earth metal compound in a particular blending ratio under an ammonia atmosphere at a lower firing temperature than in the conventional art.

<Starting Raw Material>

One major difference between the conventional art is that the molar ratio of boron carbide and the alkaline earth metal compound being the starting materials of the production method of this embodiment is boron carbide/alkaline earth metal compound=0.5-2.0. In the conventional method for producing hexagonal boron nitride using boron carbide as a starting material (Patent Literatures 1 and 2), any alkaline earth metal compound is not added.

Also, in the conventional method for producing hexagonal boron nitride using orthoboric acid as a starting material, the molar ratio of orthoboric acid/alkaline earth metal compound is 3 or more, which is largely different from this embodiment.

When the molar ratio of boron carbide to the alkaline earth metal compound, the molar ratio (boron carbide/alkaline earth metal compound) is greater than 2.0, the crystallinity of the hexagonal boron nitride cannot be adequately enhanced. Moreover, nitriding reaction does not proceed to a full extent internally in a boron carbide particle, and the amount of boron carbide remaining is increased. For this reason, the product forms a mixture of hexagonal boron nitride and boron carbide. On the other hand, when the molar ratio of boron carbide/alkaline earth metal compound is lower than 0.5, the alkaline earth metal compound becomes excess, and the hexagonal boron nitride becomes glassy. For this reason, it is hard to remove the hexagonal boron nitride from the furnace, and efficient production cannot be attained.

The lower limit of the molar ratio of boron carbide to the alkaline earth metal compound may be 0.6, or may be 1.0. The upper limit of the molar ratio may be 1.8.

The generation mechanism of hexagonal boron nitride from the mixture containing boron carbide and the alkaline earth metal in this embodiment is presumed as follows:

(1) a borate salt of the alkaline earth metal is formed on the surface of a boron carbide particle;

(2) the above borate salt serves like a flux to generate hexagonal boron nitride on the surface of the boron carbide particle;

(3) a nitriding reaction proceeds internally in the boron carbide particle to afford a hexagonal boron nitride particle.

Namely, the use of boron carbide and the alkaline earth metal compound in a predetermined molar ratio is one factor for obtaining hexagonal boron nitride particles with high crystallinity.

<Heating Step>

The heating of the mixture of boron carbide and the alkaline earth metal compound in this embodiment is conducted under an ammonia atmosphere at 1300-1500° C. In the conventional method for producing hexagonal boron nitride using boron carbide as a starting raw material, the heating temperature of 1800-2200° C. was needed (Patent Literature 2). Thus, the heating temperature is lower in this embodiment, and a relatively inexpensive heating furnace will suffice, making it superior in terms of the cost.

When the heating temperature is lower than 1300° C., the nitriding reaction does not proceed fully to the inside of the boron carbide particles and the residual amount of the boron carbide is increased. For this reason, the product forms a mixture of hexagonal boron nitride and boron carbide. Moreover, the crystallinity of the hexagonal boron nitride is also decreased. When the heating temperature is greater than 1500° C., the decomposition of ammonia occurs prior to the nitriding reaction, and hexagonal boron nitride cannot be generated.

The holding time at the maximum heating temperature is preferably 10 hours or less, and more preferably 5 hours or less from an economic point of view. The lower limit of the holding time may be, for example, 1 hour, or may be 2 hours. As the heating furnace, known industrial furnaces may be used. Examples thereof include tubular electric furnaces, box firing furnaces, tunnel furnaces, and rotary kilns.

The product after heating obtained by the heating step (heated product) contains particulate hexagonal boron nitride as the main component. The content of the hexagonal boron nitride in the heated product may be, for example, 60% by mass or more, or may be 70% by mass or more. The heated product may comprise a side-product different from hexagonal boron nitride. The side-product generated in the heating step can be removed in the next purification step.

<Purification Step (Washing Treatment)>

The heated product obtained in the heating step may comprise, in addition to the hexagonal boron nitride, a borate salt of the alkaline earth metal, and/or a boride of the alkaline earth metal as a side-product. These side-products, which are compounds different from hexagonal boron nitride, react with acids to produce nitrate salts. Since these nitrate salts are soluble in water, the side-products can be removed by a washing treatment using a washing liquid comprising an acid, and water as needed. A solid product in which the purity of the hexagonal boron nitride is higher than in the heated product can be obtained by removing the side-products. The solid product obtained here may comprise only the hexagonal boron nitride, or may comprise a trace side-product in addition to the hexagonal boron nitride.

As the acid, nitric acid is preferred in view of the solubilities of hexagonal boron nitride and side-products. An example of the washing treatment is described below. Based on 100 parts by mass of a dilute nitric acid with a nitric acid content of 5% by mass, 0.1-5 parts by mass of the heated product is blended. After blending, the resultant is stirred at room temperature for 10 minutes or more to prepare a suspension. The suspension obtained by the stirring is allowed to stand for 1 hour or more, and then the supernatant is removed by decantation. The supernatant is a nitric acid solution in which the side-product being a different compound from hexagonal boron nitride is dissolved.

Next, 100 parts by mass of water is blended based on 0.1-2 parts by mass of the heated product from which the supernatant is removed by decantation. After blending, the resultant is stirred at room temperature for 10 minutes or more. After stirring, the resultant is allowed to stand for 1 hour or more and the supernatant is removed. Such a washing operation with water having blending of water and decantation is preferably repeated 3 times or more. This can remove nitrate salts to provide a final product consisting of a single phase of the hexagonal boron nitride.

The final product is, for example, aggregates of hexagonal boron nitride particles. A powder of the hexagonal boron nitride can be obtained by a powdering step of disaggregating the final product using a mortar or the like. The mean particle size of the hexagonal boron nitride may be, for example, 0.1-300 μm, or may be 0.2-100 μm.

<Alkaline Earth Metal Compound>

Examples of the alkaline earth metal compound used in this embodiment include oxides, carbonate salts, hydroxides, and nitrate salts of an alkaline earth metal. Of these, calcium carbonate, strontium carbonate, barium carbonate are preferred. The particle size of the alkaline earth metal compound is preferably 100 μm or less, and more preferably 30 μm or less.

<Boron Carbide>

Boron carbide used in this embodiment may be general one, and for example, commercially-available boron carbide powders may be used. The smaller the particle size of the boron carbide powder, the more easily the inside of the particle of the boron carbide powder is nitrided. For this reason, the mean particle size (D50) measured by, for example, the laser diffraction/scattering method is preferably 300 μm or less, and more preferably 100 μm or less.

In this embodiment, nitriding proceeds from the surface of the boron carbide particles. Thus, the particle size of the generated hexagonal boron nitride is dependent on the particle size of boron carbide being a starting material. Namely, the shape and particle size of the hexagonal boron nitride can be controlled by the particle size of the boron carbide particles. This is a major difference from conventional particle size control by increasing the firing temperature, and/or by the firing time, and conventional shape control by spray drying treatment of flaky boron nitride particles, or by fracturing boron nitride sintered bodies.

<Definition and Evaluation Method of the Mean Particle Size>

The mean particle sizes of the alkaline earth metal compound, boron carbide or hexagonal boron nitride in the present specification is the median diameter in particle size distribution measurement by a scanning electron microscope (SEM). In the measurement, an SEM (manufactured by JEOL Ltd., Model: JSM-6390) is used. SEM images are taken at a magnification of 10000 times for the alkaline earth metal compound, at a magnification of 500-1000 times for boron carbide, and at a magnification of 180-700 times for hexagonal boron nitride, and the particle size of each particle is visually measured using a ruler. The scale shown in the micrographs is used as reference, and 100 particles are measured.

<Definition of the Graphitization Index (GI)>

The high crystallinity of the hexagonal boron nitride obtained by the production method of this embodiment is confirmed by using the Graphitization Index (GI), which is an index for the crystallinity in powder X-ray diffractometry. The GI is obtained by calculating the integrated intensity ratio, i.e., area ratio of (100), (101) and (102) peaks in the X-ray diffraction spectrum according to the following equation (J. Thomas, et. al, J. Am. Chem. Soc. 84, 4619 (1962)). The smaller the value of GI is, the higher the crystallinity is.

$$GI=[Area[(100)+(101)]]/[Area(102)]$$

The GI of the hexagonal boron nitride obtained by the production method of this embodiment is, for example, 6 or less. When the GI is above 6, excellent properties such as thermal conductivity, chemical stability, solid lubricity, thermal shock resistance and electrical insulation property cannot be exhibited in some cases. Thus, it may not be suitable in applications where these properties are required.

<Measurement Method of Graphitization Index (GI)>

The GI can be measured by using, for example, "X-ray diffractometer manufactured by JEOL Ltd., apparatus name: JDX-3500". As a pre-treatment for the measurement, the prepared hexagonal boron nitride is disaggregated into a powder. Using this powder, powder X-ray diffraction measurement is performed under the following conditions. The qualitative analysis of the product can also be performed under the same conditions. Note that when the sample comprises components other than hexagonal boron nitride, the components are removed by performing acid wash, water washing, and drying treatment before the measurement.

Tube: Cu rotating target (CuKα; λ=1.54056 Å)
Output: 40 kV-20 mA
Detector: scintillation counter
Filter: monochromator
Slit condition: soller slit 5° (incident, receiving)
DS-SS-RS=1°-1°-0.15 mm
Scanning condition: step scanning method
Step width: 0.02° counting time: 0.6 second
Measurement range: 2θ=10-80°

The production method of this embodiment is as in the (1) below. Furthermore, it may be the (2) below and/or, the (3) below.

(1) A method for producing hexagonal boron nitride, characterized in that a mixture of boron carbide and an alkaline earth metal compound is heated under an ammonia atmosphere at 1300-1500° C., wherein the molar ratio of the boron carbide and the alkaline earth metal compound is boron carbide/alkaline earth metal compound=0.5-2.0.

(2) the method for producing hexagonal boron nitride according to (1), wherein the alkaline earth metal compound is at least one selected from calcium carbonate, strontium carbonate, barium carbonate.

(3) the method for producing hexagonal boron nitride according to (1) or (2), wherein the mean particle size of the hexagonal boron nitride is 0.1-300 μm, and the graphitization index (GI) of the hexagonal boron nitride is 6 or less.

The production method of this embodiment has an effect of efficiently obtaining a high-crystalline hexagonal boron nitride powder.

The hexagonal boron nitride obtained by the above-mentioned production method can be blended in resin compositions and rubber compositions (hereinafter sometimes collectively referred to as "compositions") as a filler. That is, the applications of hexagonal boron nitride are, for example, in the above compositions. The above compositions will be described below.

The content of the hexagonal boron nitride in the compositions varies depending on the types and applications of the compositions, and is, for example, 10-90% by volume, and preferably 40-80% by volume. When the above content is less than 10% by volume, the formability of the compositions is excellent, but the thermal shock resistance and moisture resistance reliability are tend to decrease. On the other hand, when the above content is more than 90% by volume, the formability is impaired to cause unfilled portions or voids, and the electrical insulation property and the reliability are tend to be impaired.

The resin composition contains at least one of the resins mentioned below. That is, examples of the resin include epoxy resins such as bisphenol type epoxy resins, phenol novolac type epoxy resins, alicyclic epoxy resins, heterocyclic epoxy resins, glycidyl ester type epoxy resins, glycidyl amine type epoxy resins, and halogenated epoxy resins, polybenzimidazoles, polybenzoxazoles, polybenzthiazoles, polyoxadiazoles, polypyrazoles, polyquinoxalines, polyquinazolinediones, polybenzoxazinones, polyindolones, polyquinazolones, polyindoxyls, silicone resins, silicone-epoxy resins, phenol resins, melamine resins, urea resins, unsaturated polyesters, polyaminobismaleimides, diallyl phthalate resins, fluorine resins, methylpentene polymers, polyimides, polyamideimides, polyetherimides, polyamides such as 66-nylon and MXD-nylon, amorphous nylon, polyesters such as polybutylene terephthalates and polyethylene terephthalates, polyphenylene sulfides, modified polyphenylene ethers, polyallylates, wholly aromatic polyesters, polysulfones, liquid crystal polymers, polyether ether ketones, polyethersulfones, polycarbonates, maleimide-modified resins, ABS resins, AAS (acrylonitrile-acrylic rubber-styrene) resins, and AES (acrylonitrile-ethylene propylene diene rubber-styrene) resins.

The resin composition may contain a curing agent. Examples of the curing agent for epoxy resins include phenol type curing agents such as phenol novolac or cresol novolac, or acid anhydride type curing agents such as tetrahydrophthalic anhydride, hexahydrophthalic anhydride or methylhexahydrophthalic anhydride. The amount used is preferably 30-90 parts by mass based on 100 parts by mass of epoxy resins.

The rubber composition may comprise natural rubber or synthetic rubber. Examples of the synthetic rubber include butyl rubber, acrylic rubber, ethylene propylene rubber, silicone rubber, polyester elastomer, and polybutadiene.

The composition may contain the following curing accelerator, catalyst, vulcanizing agent, lubricant/release agent, stabilizer, photostabilizer, coloring agent, flame retardant, coupling agent, etc. as needed.

Examples of the curing accelerator include nitrogen-containing curing accelerators such as benzoguanamine, 2,4-dihydrazino-6-methylamino-S-triazine, imidazole derivatives such as 2-methylimidazole, 2-ethyl-4-methylimidazole, and 1-cyanoethyl-2-ethyl-4-methylimidazole, various amine complexes of boron fluoride, tertiary amine compounds such as trisdimethylaminomethylphenol, 1,8-diazobicyclo(5,4,0)-undecene-7 and benzyldimethylamine, dicyandiamide, aminoalcohol compounds obtained by reactions of bisphenol type epoxy resins or cresol novolac type epoxy resins with ammonia, and adipic acid hydrazide; and organic phosphine curing accelerators such as triphenylphosphine, tricyclohexylphosphine, methyldiphenylphosphine, tritolylphosphine, 1,2-bis(diphenylphosphino)ethane, and bis(diphenylphosphino)methane.

Examples of the catalyst include curing catalysts such as bis(tributyltin)oxide, tin dioctenoate, antimony octanoate, tin butyrate, lead monoxide, lead sulfide and lead carbonate, and polymerization catalysts such as platinum compounds.

Examples of the vulcanizing agent include benzoyl peroxide, dicumyl peroxide.

Examples of the lubricant/release agent include carnauba wax, montan wax, polyester oligomers, silicone oils, low molecular weight polyethylenes, paraffins, and metal salts, acid amides and esters of straight-chain fatty acids.

Examples of the stabilizer include 2,6-di-t-butyl-4-methylphenol, 1,3,5-tris(2-methyl-4-hydroxy-5-t-butylphenol) butane, distearyl thiodipropionate, trinonylphenyl phosphite, and tridecyl phosphite.

Examples of the photo stabilizer include 2,2'-dihydroxy-4-methoxybenzophenone, 2(2'-hydroxy-5-methylphenyl) benzotriazole, 4-t-butylphenyl salicylate, and ethyl-2-cyano-3,3-diphenylacrylate.

Examples of the coloring agent include red iron oxide, and carbon black.

Examples of the flame retardant include antimony trioxide, antimony tetraoxide, triphenylstibine, hydrated alumina, ferrocene, phosphazene, hexabromobenzene, tetrabromophthalic anhydride, tricresyl phosphate, tetrabromobisphenol A, and brominated epoxy derivatives.

Examples of the coupling agent include silane-based coupling agents such as vinyltrimethoxysilane, γ-glycidoxypropyltrimethoxysilane, γ-ureidopropyltriethoxysilane, N-β-(aminoethyl)-γ-aminopropyl trimethoxysilane, β-(3,4-epoxycyclohexyl)ethyltrimethoxysilane, titanate-based coupling agents such as isopropyltriisostearoyl titanate, dicumylphenyl oxyacetate titanate, bis(dioctyl pyrophosphate) oxyacetate titanate, isopropyltridecylbenzenesulfonyl titanate, and aluminum-based coupling agents such as acetoalkoxyaluminum diisopropylate.

FIG. 1 is a perspective view showing a heat dissipation sheet of this embodiment. The heat dissipation sheet 10 comprises hexagonal boron nitride and at least one of a resin and a rubber. The resin and rubber is obtained by curing the resin composition and rubber composition mentioned above. In the heat dissipation sheet 10, as for contents of the hexagonal boron nitride and the resin and rubber, the total of the resin and rubber is 20-100 parts by mass based on 100 parts by mass of the hexagonal boron nitride.

The heat dissipation sheet 10 in this embodiment can be fabricated by the following procedure. A slurry obtained by blending particulate hexagonal boron nitride and the resin composition and/or rubber composition is coated to form a green sheet. This green sheet is heated to, for example, 100-300° C. Thereby the resin composition and/or rubber composition is cured. The heat dissipation sheet can thus be formed where particulate hexagonal boron nitride is filled in the matrix of the resin and/or rubber.

The particulate hexagonal boron nitride produced by the production method of the above embodiment has high crystallinity. The heat dissipation sheet of this embodiment containing such hexagonal boron nitride exhibits high insulation property and high thermal conductance. For this reason, the heat dissipation sheet of this embodiment may be referred to as an insulating heat dissipation sheet.

Preferred embodiments of the present invention has been described hereinabove, however, the present invention is not limited to the above-mentioned embodiments. For example, the heat dissipation sheet of the present invention may contain other components different from the hexagonal boron nitride, resin, or rubber.

EXAMPLES

The contents of the present invention will be described in further detail by way of Examples and Comparative Examples below.

However, the present invention is not limited to Examples below unless departing from the spirit thereof Examples 1-7, Comparative Examples 1-5

Predetermined amounts of a boron carbide powder (manufactured by Denki Kagaku Kogyo K.K., grade name: S22) and a barium carbonate powder (manufactured by MTI Corporation, the mean particle size: 50 nm or less, purity: 99.9% by mass or more) were weighed and blended, and the resultant was mixed for 15 minutes using a boron carbide mortar. The prepared mixture was put on a boron nitride plate, and then placed in a tubular electric furnace. The furnace was evacuated to vacuum, and then heated to a predetermined temperature (holding temperature) at a temperature elevation rate of 10° C./min while ammonia gas was flown at a flow rate of 4 L/min. Table 1 shows the holding temperatures and holding times at the holding temperatures.

After the lapse of the holding time, heating was stopped, followed by cooling. At the time point where the temperature in the furnace was lowered to 100° C. or less, the furnace body was opened and the boron nitride plate was removed to recover the heated product. Next, 0.2 g of the heated product was charged into 50 g of dilute nitric acid (5% by mass) and the resultant was stirred at room temperature for 30 minutes to prepare a suspension. The suspension was allowed to stand for 3 hours, and then the supernatant was removed by decantation to obtain a residue. Subsequently, 50 g of water was blended into the residue, and the resultant was allowed to stand at room temperature for 3 hours and the supernatant was removed, followed by filtration. Such water washing and filtration operations were repeated 3 times. Subsequently, the obtained solid product was dried at 100° C. for 3 hours using a dryer to give a final product.

The blending ratios of the boron carbide powder and the alkaline earth metal compound, and heating conditions are shown in Table 1, and 12 types of heated products and final products of Examples 1-7 and Comparative Examples 1-5 were prepared.

Comparative Example 6

The heated product and final product were prepared as in Example 1, except that any alkaline earth metal compound was not used.

Examples 8-10

The hexagonal boron nitride was prepared as in Example 1, except that the types of the alkaline earth metal compound, and/or the blending ratio of the boron carbide powder and the alkaline earth metal compound was changed as shown in Table 1. These results are also summarized in Table 1.

The heated products and the final products prepared in Examples and Comparative Examples were each disaggregated in an agate mortar, and powder X-ray diffraction measurement was performed using an X-ray diffractometer (manufactured by JEOL Ltd., apparatus name: JDX-3500) to identify the crystal phase of the products. The identified crystal phases were as shown in Table 1 and Table 2. In Table 1 and Table 2, the identified crystal phases are listed in order of decreasing content.

In the case where the final product was confirmed to be a single phase of hexagonal boron nitride by powder X-ray diffraction measurement, the GI and mean particle size of the hexagonal boron nitride were calculated. These results are shown in Table 2. As shown in Examples and Comparative Examples in Table 1 and Table 2, high crystalline hexagonal boron nitride having a mean particle size ranging very widely from 0.3 to 85 μm can be obtained according to the present invention.

TABLE 1

| | Raw material | | | Heating conditions and crystal phase of the product | | |
|---|---|---|---|---|---|---|
| Type | Mean particle size of $B_4C$ (μm) | Alkaline earth metal compound | $B_4C$/Alkaline earth metal compound (molar ratio) | Holding temperature (° C.) | Holding time (hour) | Crystal phase of the heated product |
| Example 1 | 60 | $BaCO_3$ | 0.6 | 1450 | 4 | h-BN, $BaB_2O_4$, $Ba_2B_2O_5$ |
| Example 2 | 60 | $BaCO_3$ | 1.5 | 1450 | 4 | h-BN, $BaB_2O_4$, $Ba_2B_2O_5$ |
| Example 3 | 60 | $BaCO_3$ | 1.8 | 1450 | 4 | h-BN, $BaB_2O_4$, $Ba_2B_2O_5$ |
| Example 4 | 60 | $BaCO_3$ | 1.5 | 1350 | 4 | h-BN, $BaB_2O_4$, $Ba_2B_2O_5$ |
| Example 5 | 60 | $BaCO_3$ | 1.5 | 1500 | 4 | h-BN, $BaB_2O_4$, $Ba_2B_2O_5$ |
| Example 6 | 0.8 | $BaCO_3$ | 1.5 | 1450 | 4 | h-BN, $BaB_2O_4$, $Ba_2B_2O_5$ |
| Example 7 | 160 | $BaCO_3$ | 1.5 | 1450 | 4 | h-BN, $BaB_2O_4$, $Ba_2B_2O_5$ |
| Example 8 | 60 | $CaCO_3$ | 1.5 | 1450 | 4 | h-BN, $Ca_3B_2O_6$ |
| Example 9 | 60 | $SrCO_3$ | 1.5 | 1450 | 4 | h-BN, $SrB_2O_4$, $Sr_2B_2O_5$ |
| Example 10 | 60 | $Sr(NO_3)_2$ | 1.5 | 1450 | 4 | h-BN, $SrB_2O_4$, $Sr_2B_2O_5$ |
| Comparative Example 1 | 60 | $BaCO_3$ | 0.3 | 1450 | 4 | h-BN, $BaB_2O_4$, $Ba_2B_2O_5$ |
| Comparative Example 2 | 60 | $BaCO_3$ | 2.3 | 1450 | 4 | h-BN, $BaB_2O_4$, $Ba_2B_2O_5$ |
| Comparative Example 3 | 60 | $BaCO_3$ | 9.0 | 1450 | 4 | h-BN, $B_4C$, $BaB_2O_4$ |

TABLE 1-continued

| | Raw material | | | Heating conditions and crystal phase of the product | | |
|---|---|---|---|---|---|---|
| Type | Mean particle size of $B_4C$ (μm) | Alkaline earth metal compound | $B_4C$/Alkaline earth metal compound (molar ratio) | Holding temperature (°C.) | Holding time (hour) | Crystal phase of the heated product |
| Comparative Example 4 | 60 | $BaCO_3$ | 1.5 | 1250 | 4 | $B_4C$, h-BN, $BaB_2O_4$, $Ba_2B_2O_5$ |
| Comparative Example 5 | 60 | $BaCO_3$ | 1.5 | 1550 | 4 | $B_4C$, $BaB_2O_4$, $Ba_2B_2O_5$ |
| Comparative Example 6 | 60 | Not added | — | 1450 | 4 | $B_4C$ |

TABLE 2

| | Raw material | | | Crystal phase and physical properties of the final product | | |
|---|---|---|---|---|---|---|
| Type | Mean particle size of $B_4C$ (μm) | Alkaline earth metal compound | $B_4C$/Alkaline earth metal compound (molar ratio) | Crystal phase of the final product | GI | Mean particle size (μm) |
| Example 1 | 60 | $BaCO_3$ | 0.6 | h-BN | 2.3 | 40 |
| Example 2 | 60 | $BaCO_3$ | 1.5 | h-BN | 2.5 | 45 |
| Example 3 | 60 | $BaCO_3$ | 1.8 | h-BN | 4.3 | 47 |
| Example 4 | 60 | $BaCO_3$ | 1.5 | h-BN | 3.5 | 38 |
| Example 5 | 60 | $BaCO_3$ | 1.5 | h-BN | 1.8 | 52 |
| Example 6 | 0.8 | $BaCO_3$ | 1.5 | h-BN | 2.2 | 0.3 |
| Example 7 | 160 | $BaCO_3$ | 1.5 | h-BN | 2.7 | 85 |
| Example 8 | 60 | $CaCO_3$ | 1.5 | h-BN | 2.5 | 45 |
| Example 9 | 60 | $SrCO_3$ | 1.5 | h-BN | 2.5 | 45 |
| Example 10 | 60 | $Sr(NO_3)_2$ | 1.5 | h-BN | 2.5 | 45 |
| Comparative Example 1 | 60 | $BaCO_3$ | 0.3 | Vitrified, not removable | — | — |
| Comparative Example 2 | 60 | $BaCO_3$ | 2.3 | h-BN | 6.3 | 50 |
| Comparative Example 3 | 60 | $BaCO_3$ | 9.0 | h-BN, $B_4C$ | — | — |
| Comparative Example 4 | 60 | $BaCO_3$ | 1.5 | $B_4C$, h-BN | — | — |
| Comparative Example 5 | 60 | $BaCO_3$ | 1.5 | $B_4C$ | — | — |
| Comparative Example 6 | 60 | Not added | — | $B_4C$ | — | — |

Examples 11-12, Comparative Example 7

Blending of 100 parts by mass of the hexagonal boron nitride obtained in Example 1, Example 6, or Comparative Example 2 and 50 parts by mass of a liquid silicone rubber (manufactured by Toray Dow Corning Silicone Co. Ltd., trade name "CF-3110") afforded mixtures. Adequate amounts of toluene and a vulcanizing agent were added to these mixtures to prepare slurries. These slurries were formed into green sheets using an automated coating apparatus (manufactured by Tester Sangyo Co., Ltd., trade name: PI-1210). These green sheets were heated to 170° C. and vulcanized to produce insulating heat dissipation sheets with a thickness of 0.20 mm (0.0002 m).

The insulating heat dissipation sheet was held between a TO-3 type copper heater casing and a copper plate, and clamped at a clamping torque of 5 kgf-cm to obtain a laminate. Subsequently, a power of 15 W was applied to the heater casing and held for 5 minutes, and then the difference in the temperatures of the heater casing and the copper plate was measured. The thermal resistance in the thickness direction of the insulating heat dissipation sheet was computed according to the following calculating equation.

Thermal resistance (° C./W)=Temperature difference (° C.)/Power (W)

On the assumption that the heat transfer area between the heater casing and the copper plate is 6 cm² (=0.0006 m²), the thermal conductivity in the thickness direction of the insulating heat dissipation sheet was calculated according to the following calculating equation.

Thermal conductivity (W/m·K)=[Power (W)×Sheet thickness (0.0002 m)/Heat transfer area (0.0006 m²)]/Temperature difference (K)

These results are summarized in Table 3. As shown in Examples and Comparative Example in Table 3, the insulating heat dissipation sheets using the hexagonal boron nitride powders of Examples 1 and 6 exhibited low thermal resistance and high thermal conductivity.

TABLE 3

| Type | Hexagonal boron nitride used | Physical properties of the insulating heat dissipation sheet | |
|---|---|---|---|
| | | Thermal resistance (° C./W) | Thermal conductivity (W/m · K) |
| Example 11 | Example 1 | 0.11 | 3.0 |
| Example 12 | Example 6 | 0.17 | 2.0 |
| Comparative Example 7 | Comparative Example 2 | 0.36 | 0.9 |

INDUSTRIAL APPLICABILITY

According to the production method of the present invention, high crystalline hexagonal boron nitride can be efficiently produced. The hexagonal boron nitride obtained according to the present invention is filled as a high thermal conductive filler in a matrix such as resin to fabricate a composite material for example, and can be used in industrial fields.

REFERENCE SIGNS LIST

10: Heat dissipation sheet.

The invention claimed is:

1. A method for producing hexagonal boron nitride, comprising a heating step of heating a mixture containing boron carbide and an alkaline earth metal compound under an ammonia atmosphere at 1300-1500° C. to obtain a product containing hexagonal boron nitride, wherein a molar ratio of the boron carbide to the alkaline earth metal compound in the mixture is 0.5-2.0,
    wherein the alkaline earth metal compound is at least one selected from the group consisting of calcium carbonate, strontium carbonate, and barium carbonate, and
    wherein a graphitization index (Gl) of the hexagonal boron nitride is 4.3 or less.
2. The method for producing hexagonal boron nitride according to claim 1, further comprising a purification step of removing a solution containing a different compound from the hexagonal boron nitride from a suspension obtained by mixing the product and a washing liquid containing an acid to obtain a solid product containing the hexagonal boron nitride.
3. The method for producing hexagonal boron nitride according to claim 1, wherein a mean particle size of the hexagonal boron nitride is 0.1-300 μm.
4. The method for producing hexagonal boron nitride according to claim 1, wherein a mean particle size of the hexagonal boron nitride is 38-300 μm.
5. A method for producing hexagonal boron nitride according to claim 1, wherein the alkaline earth metal compound has a particle size of 100 μm or less.

* * * * *

UNITED STATES PATENT AND TRADEMARK OFFICE
CERTIFICATE OF CORRECTION

PATENT NO. : 9,879,168 B2
APPLICATION NO. : 15/110030
DATED : January 30, 2018
INVENTOR(S) : Tatami et al.

Page 1 of 1

It is certified that error appears in the above-identified patent and that said Letters Patent is hereby corrected as shown below:

On the Title Page

Item [73], delete:
"Denka Company Limited, Tokyo (JP)"
And insert:
--Denka Company Limited, Tokyo (JP); National University Corporation Yokohama National University, Kanagawa (JP)--

Signed and Sealed this
Tenth Day of July, 2018

Andrei Iancu
*Director of the United States Patent and Trademark Office*